(12) United States Patent
Miyashita

(10) Patent No.: US 7,844,389 B2
(45) Date of Patent: Nov. 30, 2010

(54) DUAL INJECTION TYPE INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/149,078

(22) Filed: Apr. 25, 2008

(65) Prior Publication Data

US 2008/0208439 A1    Aug. 28, 2008

Related U.S. Application Data

(62) Division of application No. 11/304,539, filed on Dec. 16, 2005, now Pat. No. 7,377,255.

(30) Foreign Application Priority Data

Jan. 4, 2005   (JP)   ............................. 2005-000187

(51) Int. Cl.
   *G06F 19/00*   (2006.01)
   *F02B 1/00*   (2006.01)
(52) U.S. Cl. ...................... 701/111; 123/429
(58) Field of Classification Search ................ 123/429, 123/294, 297, 305, 434, 435; 701/103–105, 701/111
   See application file for complete search history.

(56) References Cited

U.S. PATENT DOCUMENTS

| | | | |
|---|---|---|---|
| 5,460,031 A | 10/1995 | Fujishita et al. | |
| 6,246,953 B1* | 6/2001 | Quinn et al. | ................ 701/111 |
| 2003/0230281 A1 | 12/2003 | Hoshino | |
| 2004/0168677 A1* | 9/2004 | Mashiki | ...................... 123/501 |
| 2004/0182360 A1* | 9/2004 | Mashiki | ...................... 123/305 |
| 2005/0098156 A1 | 5/2005 | Ohtani | |
| 2006/0021422 A1 | 2/2006 | Demura et al. | |

FOREIGN PATENT DOCUMENTS

| | | |
|---|---|---|
| EP | 0-590-893 A2 | 4/1994 |
| EP | 1-450-024 A2 | 8/2004 |
| EP | 1-531-324 A2 | 5/2005 |
| JP | A-02-191819 | 7/1990 |
| JP | U-06-053728 | 7/1994 |
| JP | A-6-272607 | 9/1994 |

(Continued)

OTHER PUBLICATIONS

Japanese Office Action issued in Japanese Patent Application No. 2009-222960 on Aug. 3, 2010.

*Primary Examiner*—John T Kwon
(74) *Attorney, Agent, or Firm*—Oliff & Berridge, PLC

(57) ABSTRACT

A dual injection type internal combustion engine including an injector for in-cylinder injection and an injector for intake manifold injection includes a learning device for learning a background noise level based on an output signal of a knock sensor, and a knocking suppression control device for performing, while learning the background noise level, knocking suppression control by controlling fuel injection of the injector for in-cylinder injection or the injector for intake manifold injection. Alternatively, the engine includes a fixing device for fixing, while learning the background noise level, a start timing or end timing of fuel injection by the injector for in-cylinder injection at a basic timing determined by an operating state of the engine.

8 Claims, 9 Drawing Sheets

FOREIGN PATENT DOCUMENTS

| | | |
|---|---|---|
| JP | A-10-159642 | 6/1998 |
| JP | A-2000-145532 | 5/2000 |
| JP | A-2002-130027 | 5/2002 |
| JP | A-2002-227697 | 8/2002 |
| JP | A-2003-013784 | 1/2003 |
| JP | A-2003-013785 | 1/2003 |
| JP | A-2004-3429 | 1/2004 |
| JP | A-2004-251218 | 9/2004 |
| JP | A-2004-270583 | 9/2004 |
| JP | A-2004-278461 | 10/2004 |
| JP | A-2004-308618 | 11/2004 |
| JP | A-2005-146924 | 6/2005 |
| JP | A-2005-248804 | 9/2005 |

* cited by examiner

DUAL INJECTION TYPE INTERNAL COMBUSTION ENGINE

This application is a division of U.S. patent application Ser. No. 11/304,539, filed Dec. 16, 2005, the entire contents of which are hereby incorporated by reference.

This nonprovisional application is based on Japanese Patent Application No. 2005-000187 filed with the Japan Patent Office on Jan. 4, 2005, the entire contents of which are hereby incorporated by reference.

BACKGROUND OF THE INVENTION

1. Field of the Invention

The present invention relates to a dual injection type internal combustion engine and, more specifically, to a dual injection type internal combustion engine including an injector for in-cylinder injection for injecting fuel to the inside of a cylinder and an injector for intake manifold injection for injecting fuel to the intake manifold or to an intake port, provided with learning means for learning background noise level used as a reference at the time of knock determination.

2. Description of the Background Art

A so-called dual injection type internal combustion engine has been known that generally includes an injector for in-cylinder injection for injecting fuel to the inside of a cylinder and an injector for intake manifold injection for injecting fuel to the intake manifold or to an intake port, in which the injectors are switched and used in accordance with the operating state of the engine, to realize, for example, stratified charge combustion in a low-load operating range and homogeneous combustion in a high-load operating range or to inject fuel from each of the injectors at a prescribed contribution ratio in accordance with the operating state, so as to improve mileage and output characteristics.

As is well known, in many internal combustion engines, a knock determination is made to determine the presence or absence of knock and knock control is performed in which spark timing and the like is adjusted in accordance with the determination results. Ordinarily, the knock determination is made using a knock sensor, which is a vibration detecting sensor mounted on the cylinder block or the like. The presence or absence of knock is then detected based on an output signal from the knock sensor during a predetermined period (knock determination period or gate period) set close to the compression top dead center of each cylinder (see, for example, Japanese Patent Laying-Open No. 2004-251218).

The output signal of the knock sensor includes, in addition to the signals derived from knocking, various signals that come from the vibration of engine itself. Such signals are referred to as a background noise, a threshold value is set using the background noise level as a reference, and when the output value of the knock sensor exceeds the threshold value in the knock determination, it is determined that knock is occurring.

The background noise level varies in accordance with the operating state of the engine. Generally, the higher the engine speed and the higher the engine load, the higher becomes the background noise level.

As the background noise level varies in accordance with the operating state of the engine, the value of the background noise level set in a prescribed operating range of the engine is not always a suitable value in another operating range of the engine. By way of example, when a threshold value is set using a low background noise level as a reference in a low speed range of the engine and the engine enters a high speed operating state, the background noise level would increase and the sensor output value exceeds the threshold value because of the background noise itself, resulting in an erroneous determination that knock is occurring.

Therefore, in such a case, it is necessary to newly set a high background noise level for a high-speed operating state of the engine, and to newly set a high threshold value for the high-speed range. Learning of a background noise level based on an actual output signal of the knock sensor in a certain operating range of the engine is "background learning." When the background learning is done in the high-speed range, it becomes possible to set a high background noise level for the high-speed range and to set a high threshold value.

When background learning is being executed, however, the output signals from the knock sensor are treated exclusively as the background noise while the threshold value for knock determination is not yet determined, and therefore, knock determination is impossible. Accordingly, it is also impossible to perform knock control for adjusting the spark timing and the like in accordance with the knock determination results and hence, knocking may possibly occur.

As disclosed in Japanese Patent Laying-Open No. 2004-251218, in an in-cylinder injection type internal combustion engine, operational noise of the injector at the start and end timings of injection of the in-cylinder injector may ride on the output signals of the knock sensor, forming a part of the background noise. During background learning, such a state having the operational noise of the injector riding on the signals is rather preferable, as it enables accurate background learning.

SUMMARY OF THE INVENTION

The present invention was made in view of the foregoing, and its object is to suppress knocking during background learning and to provide a dual injection type internal combustion engine that allows execution of accurate background learning.

The above-described objects of the present invention can be attained by an aspect of the present invention that provides a dual injection type internal combustion engine including an injector for in-cylinder injection and an injector for intake manifold injection, including: a knock sensor; a learning portion learning a background noise level based on an output signal of the knock sensor; and a knocking suppression control portion performing, while learning the background noise level, knocking suppression control by controlling fuel injection of the injector for in-cylinder injection or the injector for intake manifold injection.

By this arrangement, during learning of the background noise level, the knocking suppression control is executed for controlling fuel injection by the injector for in-cylinder injection or the injector for intake manifold injection, and therefore, knocking can effectively be suppressed during learning of the background noise level.

Preferably, the knocking suppression control portion increases ratio of fuel injection quantity by the injector for in-cylinder injection with respect to the injector for intake manifold injection to be larger than a basic ratio of fuel injection quantity determined by the operating state of the engine.

The in-cylinder injection by the in-cylinder injector has a function of lowering the temperature of air taken into the cylinder because of latent heat in vaporization of fuel, which function serves to suppress occurrence of knocking. Therefore, this approach of increasing the ratio of in-cylinder injection quantity from the basic ratio of injection quantity is suitable for suppressing knocking.

Preferably, the knocking suppression control portion executes synchronous injection in which at least part of an injection period of fuel injection by the injector for intake manifold injection is overlapped with a valve-open period of an intake valve.

Because of this synchronous injection in which at least a part of the injection period of port injection is overlapped with the valve-open period of the intake valve as described above, the port injection fuel can positively be taken into the in-cylinder combustion chamber, over the flow of intake air in the intake manifold or intake port. Consequently, functions and effects similar to those of the in-cylinder injection can be attained, suitably suppressing knocking.

Preferably, the knocking suppression control portion increases ratio of fuel injection quantity by the injector for in-cylinder injection in a compression stroke with respect to an intake stroke to be larger than a basic ratio of fuel injection quantity determined by the operating state of the engine.

When the ratio of fuel injection quantity in the compression stroke of in-cylinder injection is increased, the in-cylinder injection can be done at a timing more closer to the time of combustion, and therefore, disturbance in mixed air in the cylinder can be promoted, the rate of combustion can be increased and knocking can be suppressed.

According to another aspect, the present invention attaining the above described objects provides a dual injection type internal combustion engine including an injector for in-cylinder injection and an injector for intake manifold injection, including: a knock sensor; a learning portion learning a background noise level based on an output signal of the knock sensor; and a fixing portion fixing, while learning the background noise level, a start timing or end timing of fuel injection by the injector for in-cylinder injection at a basic timing determined by the operating state of the engine.

When the above-described knocking suppression control is performed during the background learning, the quantity of fuel injection by the in-cylinder injector is changed from the basic value determined by the operating state of the engine and, as a result, start timing or end timing of fuel injection might be changed from the basic timing. On the other hand, in the dual injection type internal combustion engine in accordance with the aforementioned another aspect, the start timing or end timing of fuel injection by the injector for in-cylinder injection is fixed at the basic timing that is determined by the operating state of the engine during learning of the background noise level. Therefore, if the operational noise of the injector is riding on the background noise in the basic state, it is possible to maintain such a state during the background learning, and hence accurate background learning becomes possible.

According to the present invention, in a dual injection type internal combustion engine, superior effects of suppressing knocking during background learning and realizing accurate background learning can be attained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures.

(1) Basic Configuration

Figure 1:
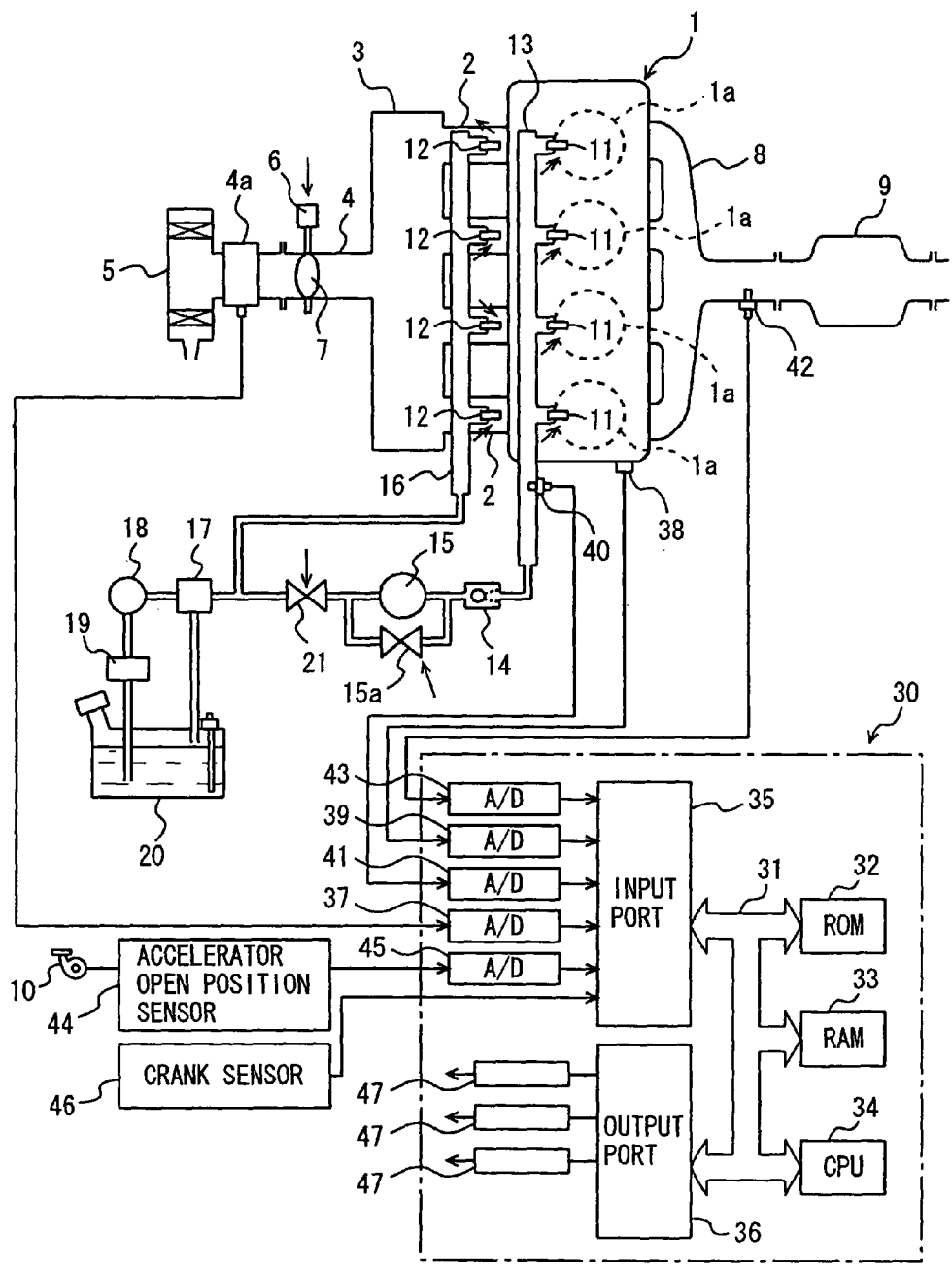
FIG. 1 is a schematic diagram showing the configuration of dual injection type internal combustion engine in accordance with one embodiment of the present invention.

First, referring to FIG. 1 showing the schematic configuration of the dual injection type internal combustion engine in accordance with the present invention, an engine 1 includes a plurality of (four in the present embodiment) cylinders 1a, and each cylinder 1a is connected through a corresponding intake branch pipe 2 to a common surge tank 3. Surge tank 3 is connected through an intake duct 4 to an air cleaner 5, and in intake duct 4, an air flow meter 4a, and a throttle valve 7 driven by an electric motor 6 are arranged. Throttle valve 7 has its opening position controlled based on an output signal of an electronic control unit 30, independent from an accelerator pedal 10. Each cylinder 1a is coupled to a common exhaust manifold 8, which manifold 8 is coupled to a three-way catalyst converter 9.

For each cylinder 1a, an intake port, an exhaust port, an intake valve and an exhaust valve, not shown, are provided, and the intake and exhaust valves are driven to open/close by an actuator or a cam shaft driven in synchronization with the engine. Further, for each cylinder 1a, a spark plug, not shown, an injector 11 for in-cylinder injection for injecting fuel into the cylinder, and an injector 12 for intake manifold injection for injecting fuel into the intake manifold are provided. Injectors 11 and 12 are each controlled based on an output signal of electronic control unit 30. Further, injectors 11 for in-cylinder injection are connected to a common fuel delivery pipe 13, and fuel delivery pipe 13 is connected to an engine-driven high-pressure fuel pump 15, through a check valve 14 that allows passage toward fuel delivery pipe 13.

As shown in FIG. 1, the discharge side of high-pressure fuel pump 15 is coupled to the intake side of high-pressure fuel pump 15 through a spill electromagnetic valve 15a, and the smaller the opening position of spill electromagnetic valve 15a, the larger becomes the quantity of fuel supplied from high-pressure fuel pump 15 to fuel delivery pipe 13. When the spill electromagnetic valve 15a is fully open, fuel supply from the high-pressure fuel pump 15 to fuel delivery pipe 13 is stopped. It is noted that spill electromagnetic valve 15a is controlled based on the output signal of electronic control unit 30.

Each injector 12 for intake manifold injection is connected to a common fuel delivery pipe 16, and fuel delivery pipe 16 and high-pressure fuel pump 15 are connected through a common fuel pressure regulator 17 to an electric-motor-driven low-pressure fuel pump 18. Further, low-pressure fuel pump 18 is connected through a fuel filter 19 to a fuel tank 20. Fuel pressure regulator 17 is adapted such that when the fuel pressure discharged from low-pressure fuel pump 18 becomes higher than a predetermined set fuel pressure, fuel pressure regulator 17 returns part of the fuel discharged from low-pressure fuel pump 18 to fuel tank 20, and therefore, it prevents the pressure of fuel supplied to injector 12 for intake manifold injection and the pressure of fuel supplied to high-pressure fuel pump 15 from becoming higher than the set fuel pressure mentioned above. Further, as shown in FIG. 1, an open/close valve 21 is provided between high-pressure fuel pump 15 and fuel pressure regulator 17. The open/close valve 21 is normally open, and when it is closed, fuel supply from low-pressure fuel pump 18 to high-pressure fuel pump 15 is stopped. Opening and closing of open/close valve 21 are controlled based on the output signal of electronic control unit 30.

Electronic control unit 30 is implemented by a digital computer, and includes an ROM (Read Only Memory) 32, an RAM (Random Access Memory) 33, a CPU (micro processor) 34, an input port 35 and an output port 36, which are connected to each other through a bi-directional bus 31. Air flow meter 4a generates an output voltage that is in proportion to the quantity of intake air, and the output voltage of air flow meter 4a is input through an AD converter 37 to input port 35. A coolant temperature sensor 38 generating an output voltage that is in proportion to the temperature of engine coolant is attached to engine 1, and the output voltage of coolant temperature sensor 38 is input through an AD converter 39 to input port 35.

A fuel pressure sensor 40 generating an output voltage that is in proportion to the fuel pressure in fuel delivery pipe 13 is attached to fuel delivery pipe 13, and the output voltage of fuel pressure sensor 40 is input through an AD converter 41 to input port 35. An air-fuel ratio sensor 42 generating an output voltage that is in proportion to the oxygen concentration in exhaust gas is attached to an exhaust manifold 8 on the upstream side of catalyst 9, and the output voltage of air-fuel ratio sensor 42 is input through an AD converter 43 to input port 35. The air-fuel ratio sensor of the present embodiment is a full-range air-fuel ratio sensor (linear air-fuel ratio sensor) that generates an output voltage that is in proportion to the air-fuel ratio of the air-fuel mixture combusted in engine 1. As air-fuel ratio sensor 42, an $O_2$ sensor that detects, in an on-off manner, whether the air-fuel ratio of air-fuel mixture combusted in engine 1 is rich or lean as compared with the theoretical air-fuel ratio may be used.

Accelerator pedal 10 is connected to an accelerator open position sensor 44 generating an output voltage that is in proportion to the amount of pressing the accelerator pedal 10, and the output voltage of accelerator open position sensor 44 is input through an AD converter 45 to input port 35. To input port 35, a crank sensor 46 is connected, which generates an output pulse at every prescribed crank phase of the engine. The pulse signal is transmitted to CPU 34 and based on the pulse signal, CPU calculates the engine speed. In ROM 32 of electronic control unit 30, values of basic fuel injection quantity, timing of fuel injection, timing of ignition and the like are mapped and stored in advance, which values are set in correspondence with the engine speed obtained by crank sensor 46 and engine load obtained by accelerator open position sensor 44.

Further, a knock sensor 23, which is a vibration sensor, is arranged in a cylinder block of the engine. Knock sensor 23 is common to four cylinders 1a, and positioned between central two cylinders 1a among four cylinders 1a arranged in series. Knock sensor 23 generates an output voltage that is in proportion to the vibration level of the engine, and the output voltage of knock sensor 23 is input through an AD converter 25 to input port 35. The four cylinders 1a arranged in series are respectively referred to as the first cylinder #1, second cylinder #2, third cylinder #3 and fourth cylinder #4 from an end.

(2) Basic Control

Figure 2:
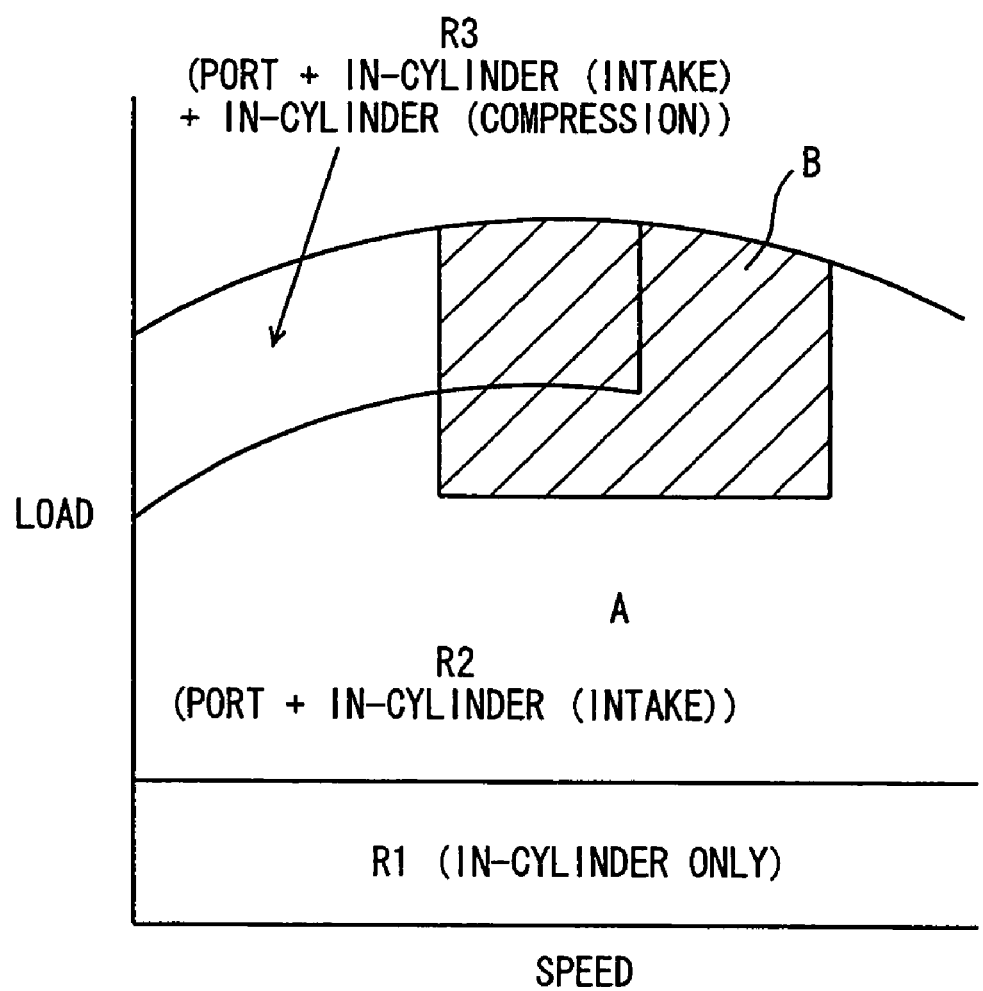
FIG. 2 shows various ranges in the entire operating range of the engine.

The basic fuel injection control performed by electronic control unit 30 will be described. ROM 32 of electronic control unit 30 stores a three-dimensional map such as shown in FIG. 2, that determines in advance the relation between the basic quantity of fuel injection and the speed and load of the engine 1. The entire range of the map, that is, the entire operating range of the engine is divided into three ranges, namely, first, second and third ranges R1, R2 and R3.

In the first range R1, the speed is full-speed and the load is low, and only the in-cylinder injection is performed by injector 11 for in-cylinder injection. The in-cylinder injection is performed in the compression stroke of the engine, whereby stratified charge combustion is performed. Specifically, a relatively rich layer of air-fuel mixture is formed around the spark plug and an air layer is formed therearound, so that satisfactory ignition of air-fuel mixture is assured while the average air-fuel ratio in the entire combustion chamber can be made leaner than the theoretical air-fuel ratio, whereby improved mileage can be attained.

In the third range R3, the speed is low to middle speed and the load is high, and both the port injection by injector 12 for intake manifold injection and in-cylinder injection by injector 11 for in-cylinder injection are performed. The in-cylinder injection here is performed in the intake stroke and the compression stroke of the engine. This leads to homogeneous combustion particularly for high load. Specifically, port injection is performed before the intake valve is opened, followed by in-cylinder injection in the intake stroke. Consequently, a large part of the fuel of the total quantity of fuel injection forms a sufficiently homogeneous air-fuel mixture with the taken air in the combustion chamber. The air-fuel mixture is mixed with the injected fuel introduced by the in-cylinder injection in the compression stroke and sparked. By in-cylinder injection, the temperature of intake air and the air-fuel mixture can be lowered, because of latent heat in vaporization of fuel. Therefore, the intake air filling efficiency increases, and the engine output is enhanced. Further, particularly because of the in-cylinder injection in the compression stroke immediately before ignition, knock resistance can also be improved.

The second range R2 is the range other than the first and third ranges R1 and R3, in which both the port injection by injector 12 for intake manifold injection and in-cylinder injection by injector 11 for in-cylinder injection are performed. Here, in-cylinder injection is performed only in the intake stroke of the engine. This also realizes homogeneous combustion. Specifically, port injection is performed before the intake valve is opened, followed by the in-cylinder injection in the intake stroke. Thus, the fuel of total quantity of fuel injection forms, together with the intake air, sufficiently homogeneous air-fuel mixture in the combustion chamber, which air-fuel mixture is sparked by ignition after compression.

In the second and third ranges R2 and R3, the ratio of injection quantity by injector 11 for in-cylinder injection and injector 12 for intake manifold injection, that is, the ratio of fuel injection quantity by injector 11 for in-cylinder injection and injector 12 for intake manifold injection with respect to the total quantity of fuel injection, is determined in advance for every engine speed and load. This ratio is represented as injection contribution ratio $\alpha$, and the injection contribution ratio $\alpha$ refers to the ratio of fuel injection quantity injected from injector 11 for in-cylinder injection to the total quantity of fuel injection. By way of example, if the injection contribution ratio $\alpha$ is 0.3 (30%), the ratio of fuel injected from injector 11 for in-cylinder injection is 30% of the total quantity of fuel, and the ratio of fuel injected from injector 12 for intake manifold injection is 70% ($=1-\alpha$) of the total quantity of fuel injection.

Further, in the third range R3, the ratio of fuel injection quantity injected by injector 11 for in-cylinder injection in the intake stroke and the compression stroke, respectively, is determined in advance for every speed and load. The ratio is represented as in-cylinder injection contribution ratio $\beta$, and the in-cylinder injection contribution ratio $\beta$ refers to the ratio of fuel injection quantity injected in the compression stroke to the total fuel injection quantity injected by injector 11 for in-cylinder injection. By way of example, if the in-cylinder injection contribution ratio $\beta$ is 0.3 (30%), the ratio of fuel injection from injector 11 for in-cylinder injection in the intake stroke is 70% ($1-\beta$), and the ratio of fuel injection from injector 11 for in-cylinder injection in the compression stroke is 30%.

The values $\alpha$ and $\beta$ of injection contribution ratios are determined in advance for every speed and load, and stored as a map in ROM 32.

Though not shown, the timings of injection (meaning the start timings of injection) by injector 11 for in-cylinder injection and injector 12 for intake manifold injection are also determined in advance as functions of speed and load for the entire operating range of the engine, and stored as a map in ROM 32.

Further, particularly for the in-cylinder injection by injector 11, injection pressure is also controlled. Specifically, fuel pressure in fuel delivery pipe 13 that corresponds to the injection pressure is determined in advance as a function of speed and load for the entire operating range of the engine, and stored as a map in ROM 32. Feed back control is performed such that the actual fuel pressure detected by fuel pressure sensor 40 matches the target fuel pressure calculated from the map. At this time, the actual fuel pressure is increased or decreased by controlling spill electromagnetic valve 15a.

By the above-described configuration, electromagnetic control unit 30 determines the quantity and timing of fuel injection by injectors 11 and 12 based on the detected speed and load values and on the plurality of maps mentioned above, and determines the target fuel pressure in fuel delivery pipe 13. The time of electric conduction to injectors 11 and 12 that corresponds to the fuel injection quantity is calculated, and by adding the calculated time of electric conduction to the timing of fuel injection, the timing of closing the valves of injectors 11 and 12, that is, the end timing of injection, is determined.

Before the timing of injection by injectors 11 and 12, the actual fuel pressure is set beforehand to the target fuel pressure determined in the above-described manner, and when it comes to the timing of injection by injectors 11 and 12, a driving signal is output to injectors 11 and 12 (that is, injectors 11 and 12 are turned on), so as to open the valve of injectors 11 and 12. Such electrically conducted state, that is, valve-open state of injectors 11 and 12 is maintained to the injection end timing, and when it comes to the injection end timing, output of the driving signal to the injectors 11 and 12 is stopped (that is, injectors 11 and 12 are turned off), so that injectors 11 and 12 are closed.

When injectors 11 and 12 are turned on, the electromagnetic solenoid of each of injectors 11 and 12 is energized, and by electromagnetic attraction generated thereby, the nozzle needle is moved away from the valve seat. Consequently, injection opening of injectors 11 and 12 is opened and injection starts. When injectors 11 and 12 are turned off, the electromagnetic solenoid is de-energized, so that the nozzle needle comes to be seated back against the valve seat. Consequently, injection opening is closed and injection ends. As will be described later, the nozzle needle abutting or hitting the needle stopper and the valve seat as the injector 11 for in-cylinder injection is turned on and off may possibly be detected by knock sensor 23, momentarily heightening the output signal level of the knock sensor 23.

(3) Knock Determination and Knock Control

In the dual injection type internal combustion engine in accordance with the present embodiment, knock determination is made based on an output signal of knock sensor 23, and in accordance with the result of determination, knock control is performed to adjust spark timing and the like. This will be described in the following.

When it is determined in knock determination that knocking is occurring, electronic control unit 30 as the knock control means retards the target spark timing by a prescribed amount. On the contrary, when it is determined that knocking is not occurring, electronic control unit 30 gradually advances the target spark timing. The target spark timing represents the timing of spark in each cylinder by a crank angle with the compression top dead center of each cylinder used as a reference. Electromagnetic unit 30 outputs a spark signal that turns on at a timing indicated by the target spark timing to an igniter (not shown) of each cylinder, for ignition. Thus, the spark timing is adjusted to be close to a limit of knocking occurrence.

The knock determination will be described next. As shown in FIG. 2, the entire operating range of the engine is divided beforehand to a low noise range (hereinafter referred to as range A) in which the threshold for knock determination is set to a relatively low value and a high noise range (hereinafter referred to as range B) in which the threshold for knock determination is set to a relatively high value. The range B is the hatched range in which the engine speed is high and the engine load is high. The range A is the remaining range. The range B partially overlaps with a part of the second range and a part of the third range. In the following, the knock determination will be outlined, assuming that the operating state of the engine is in range A.

Figure 3:
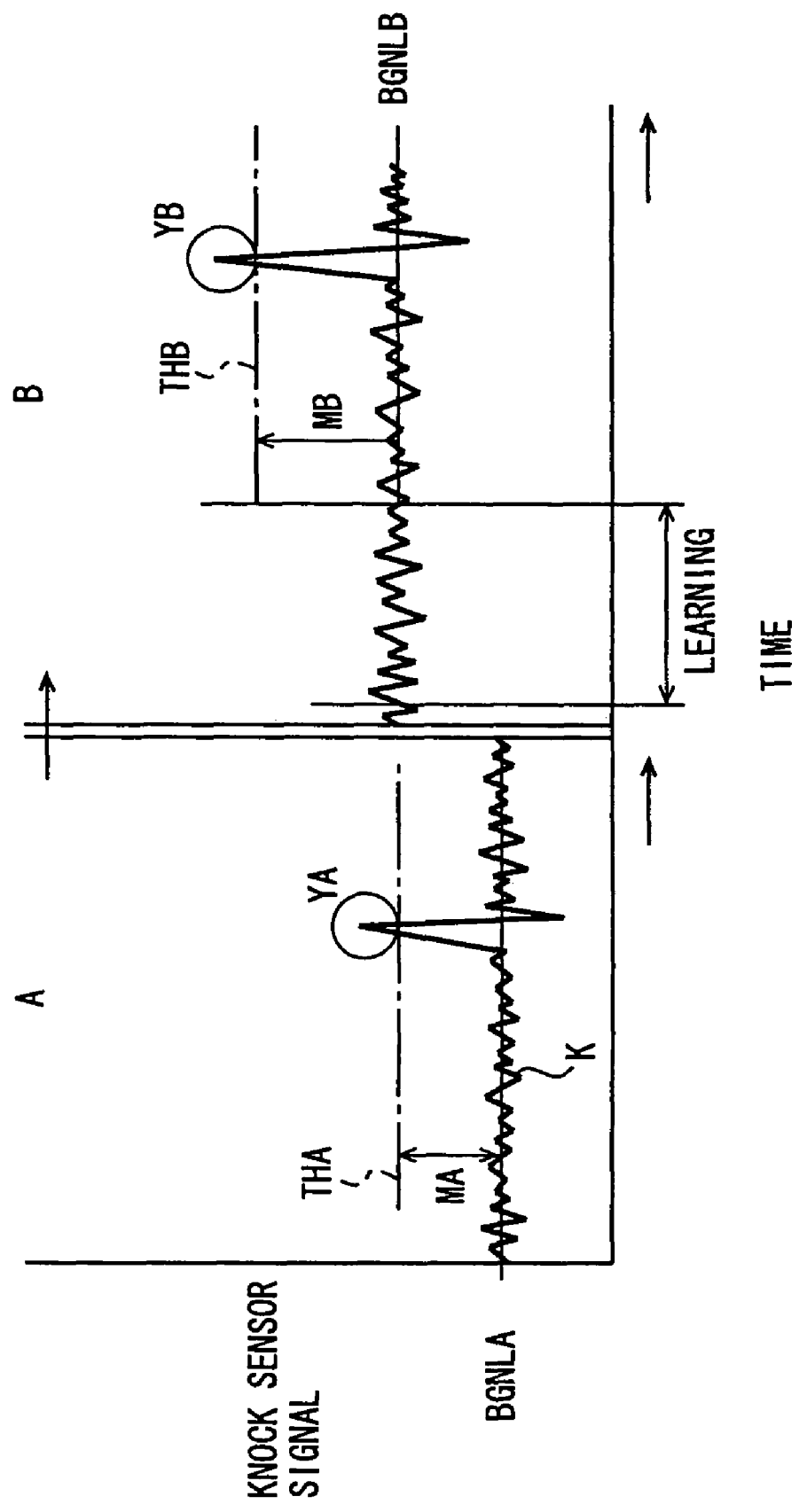
FIG. 3 illustrates the method of knock determination.

As shown on the left side of FIG. 3, an output signal K of knock sensor 23 is transmitted to electronic control unit 30, and electronic control unit 30 compares the magnitude of output signal K, that is, the output value, with a knock determination threshold value THA that has been stored beforehand in ROM 32. When the output value of knock sensor 23 exceeds the threshold value THA (as represented by YA in the figure), electromagnetic control unit 30 determines that knocking is occurring. As a result, the spark timing retarding control as described above is executed. The knock determination as such is performed only on the signal K that exists in the gate period, which is the prescribed range of crank phase of the engine.

The threshold value THA is set by adding a prescribed value MA to a standard background noise level BGNLA of range A. Here, the background noise refers to signals output from knock sensor 23 resulting from factors other than knocking, such as combustion in the engine cylinder, vibration of dynamic valves and crank vibration. The magnitude of background noise is referred to as the background noise level.

As described above, the background noise level varies in accordance with the operating state of the engine. Generally, the background noise level tends to increase as the engine speed becomes higher and the engine load becomes higher.

As shown on the right side of FIG. 3, range B is set in advance as a range in which the background noise level is high. In range B, the background noise level BGNLB is higher than the level BGNLA of range A. When the same threshold THA as in range A is adopted in range B as such, the knock sensor output value may exceed the threshold value THA because of the background noise itself even if knocking were not occurring, possibly leading to an erroneous determination that knocking is occurring. In other words, range B is prone to such erroneous determination.

In order to prevent such an erroneous determination, in the present embodiment, the background noise level is learned in range B in which the background noise level tends to be high, and based on the result, knock determination threshold is increased. Specifically, when the operating state of the engine makes a transition from range A to range B, background learning for determining the background noise level BGNLB is executed for a prescribed time period. By adding a prescribed value MB to the background noise level BGNLB obtained in this manner, the knock determination threshold value THB in range B is set and stored, and thereafter in range B, knock determination is made based on the newly set threshold value THB. When the output value of knock sensor 23 exceeds the threshold value THB (as represented by YB in the figure), electronic control unit 30 determines that knocking is occurring. After this determination, spark timing retarding control is performed in the similar manner as described above. The added value MB for range B may be or may not be the same as added value MA for range A.

The knock determination threshold value THB in range B obtained in this manner is larger than the knock determination threshold value THA in range A, and therefore, erroneous determination that knocking is occurring resulting from the background noise itself can be prevented.

The output signal of knock sensor 23, however, is treated exclusively as the background noise while background learning is being done, and the knock determination threshold has not yet been determined. Therefore, in this period, knock determination is impossible. Therefore, knock control by which the spark timing is adjusted in accordance with the result of knock determination is not possible either, and as a result, there is a possibility of knocking.

In order to solve this problem, in the present embodiment, knocking suppression control means is provided for executing knocking suppression control, which suppresses knocking, by controlling fuel injection by injector 11 for in-cylinder injection or injector 12 for intake manifold injection during background learning. This will be described in the following.

(4) Knocking Suppression Control

In the first approach of such knocking suppression control, the ratio of fuel injection by injector 11 for in-cylinder injection with respect to injector 12 for intake manifold injection is increased from the basic ratio of injection determined by the operating state of the engine. Specifically, the in-cylinder injection by injector 11 for in-cylinder injection has functions of lowering intake air temperature in the cylinder because of latent heat in vaporization of fuel, promoting disturbance of air-fuel mixture in the cylinder because of the penetrating force of injected fuel and lowering the temperature of air-fuel mixture in the cylinder during compression and increasing the rate of combustion. These functions are effective to suppress knocking, and therefore, the first approach in which the ratio of in-cylinder injection is increased than the basic ratio of injection is suitable for suppressing knocking.

Figure 4:
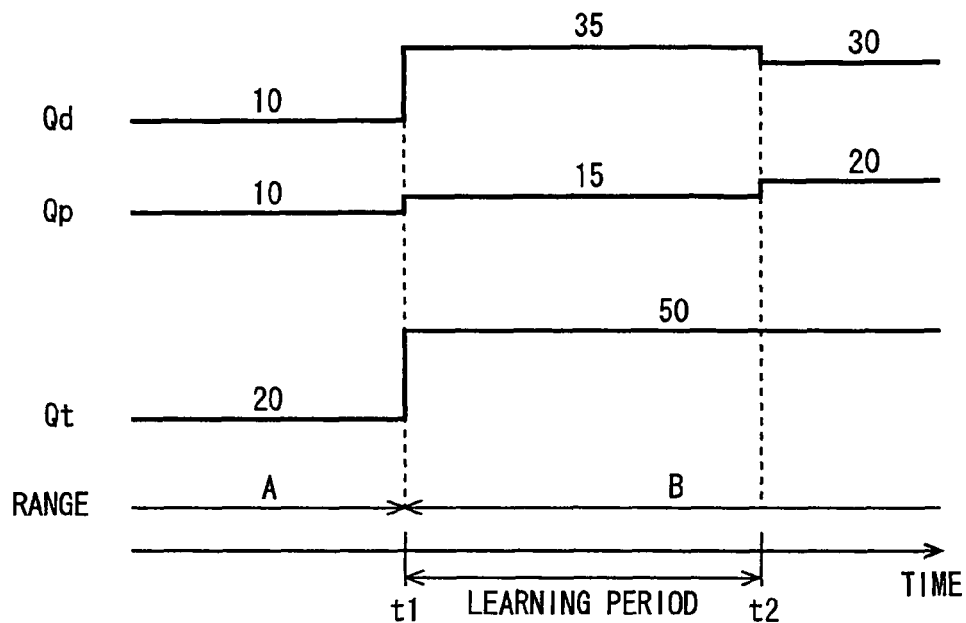
FIG. 4 is a time chart representing a first approach of knocking suppression control.

An example of the first approach will be described with reference to FIG. 4. In the shown example, at time point t1, the operating state of the engine makes a transition from range A to range B, and from time point t1 to t2, background learning is performed. Before transition, the total quantity of fuel injection Qt, quantity of port injection Qp and quantity of in-cylinder injection Qd are 20, 10 and 10, respectively. After transition, the total quantity of fuel injection Qt, quantity of port injection Qp and quantity of in-cylinder injection Qd are supposed to be 50, 30 and 20, in accordance with the basic control of fuel injection described above. By the first approach of knocking suppression control, however, the ratio of in-cylinder injection is increased from the basic ratio of in-cylinder injection in the learning period, so that the total quantity of fuel injection Qt, quantity of port injection Qr and quantity of in-cylinder injection Qd are set to 50, 15 and 35, respectively. In terms of the injection contribution ratio α (ratio of fuel injection quantity of in-cylinder injection to the total quantity of fuel injection), though the originally supposed value after transition is 30/50=60%, the ratio is increased to 35/50=70% during learning.

Preferably, during background learning, the ratio of in-cylinder injection is set to 100% and only the in-cylinder injection is performed. Thus, the above-described knocking suppressing effect can be fully made use of, and occurrence of knocking can be suppressed to the full extent.

Range B in which the background learning is done includes the second range R2 in which port injection and in-cylinder injection of intake stroke are performed, and the third range R3 in which port injection and in-cylinder injection of intake and compression strokes are performed. The knocking suppression control of the first approach can be performed no matter to which of the second and third ranges R2 and R3 the operating state of the engine enters.

Next, in the second approach of knocking suppression control, synchronous injection is executed, in which at least part of the fuel injection period by injector 12 for intake manifold injection is overlapped with the open period of the intake valve. Specifically, by such a synchronous injection, the port injected fuel can positively be introduced to the in-cylinder combustion chamber as the fuel can be carried over the flow of intake air generated by the opening of the intake valve or intake port, while preventing adhesion to the port wall surface, whereby similar functions and effects as attained by the in-cylinder injection described above can be obtained.

As described above, in the present embodiment, when port injection is executed under the basic control, the basic injection period is determined such that the injection ends before the intake valve is opened (that is, asynchronous injection). In contrast, in the second approach, the port injection is not yet finished when the intake valve is in the open state, and port injection is performed while the intake valve is open. Port injection ends after opening of the intake valve has started. Therefore, by such synchronous injection during background learning, the injection period can be retarded, and because of the functions described above, knocking can be better suppressed than in the case of basic port injection.

In the third approach of knocking suppression control, for the in-cylinder injection by in-cylinder injector 11, the ratio of fuel injection quantity in compression stroke to the quantity in intake stroke is increased from the basic ratio of injection quantity determined by the operating state of the engine. Specifically, when the ratio of fuel injection quantity in the compression stroke is increased, in-cylinder injection becomes possible at a timing closer to the timing of combustion, whereby the disturbance of air-fuel mixture in the cylinder can be promoted, rate of combustion can be increased and knocking can be suppressed. The third approach of knocking suppression control is on the premise that the in-cylinder injection is performed both in the intake stroke and the compression stroke, and therefore, it is performed in that portion of range B which overlaps with the third range R3.

Figure 5:
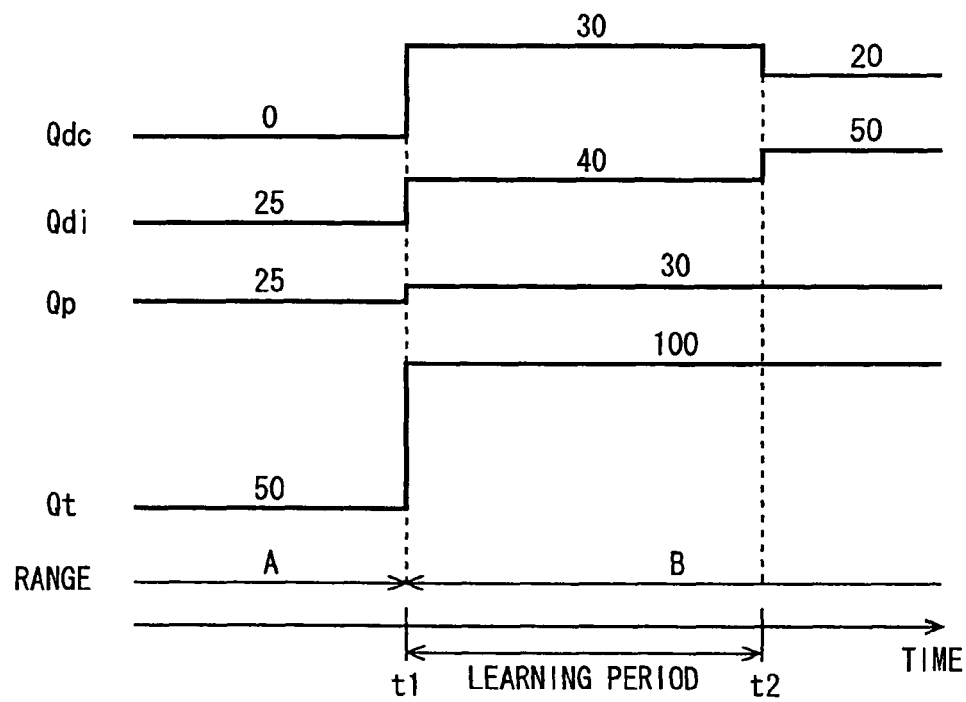
FIG. 5 is a time chart representing a third approach of knocking suppression control.

An example of the third approach will be described specifically with reference to FIG. 5. In the shown example, the operating state of the engine makes a transition from range A to range B at time point t1, and in the period between t1 and t2, background learning is performed. Before transition, the total quantity of fuel injection Qt, quantity of port injection Qp and quantity of in-cylinder injection of intake stroke Qdi and quantity of in-cylinder injection of compression stroke Qdc are 50, 25, 25 and 0, respectively. After transition, the total quantity of fuel injection Qt, quantity of port injection Qp and quantity of in-cylinder injection of intake stroke Qdi and quantity of in-cylinder injection of compression stroke Qdc are supposed to be 100, 30, 50 and 20, in accordance with the basic fuel injection control described above. Because of the knocking suppression control of the third approach, however, the ratio of in-cylinder injection of the compression stroke is increased from the basic ratio of in-cylinder injection of the compression stroke, and the total quantity of fuel injection Qt, quantity of port injection Qp and quantity of in-cylinder injection of intake stroke Qdi and quantity of in-cylinder injection of compression stroke Qdc are 100, 30, 40 and 30, respectively. In terms of the in-cylinder injection contribution ratio $\beta$ (the ratio of fuel injection quantity injected in the compression stroke to the total fuel injection quantity for in-cylinder injection), the originally supposed value after transition is 20/70=29%, while it is increased to 30/70=43% during learning.

One or two or more of the first to third approaches may be selected and combined, as needed.

(5) Fixing the Start Timing or End Timing of In-Cylinder Injection

By the knocking suppression control described above, knocking during background learning can be suppressed. It is noted, however, that when such knocking suppression control is performed, the quantity of fuel injection for the in-cylinder injection is changed from the basic value, possibly resulting in the following problem.

Specifically, as described previously, the injector for injecting fuel is structured such that by energizing the electromagnetic solenoid, the nozzle needle is driven away from the valve seat and the valve is opened and fuel injection starts, and by de-energizing the electromagnetic solenoid, the nozzle needle comes to be seated against the valve seat and fuel injection ends.

In the injector as such, when the valve is opened, the nozzle needle abuts the valve stopper and generates vibration by the impact at that time, and when the valve is closed, the nozzle needle is seated against the valve seat and generates vibration by the impact at that time. Such vibrations generated at the time of opening and closing the valve of the injector may ride as noise on the output signal of the knock sensor. Particularly in the dual injection type internal combustion engine as described above, injector 11 for in-cylinder injection is positioned close to the knock sensor 23 and the vibration generated at injector 11 for in-cylinder injection tends to be directly transmitted to knock sensor 23 through the cylinder block, and therefore, the influence of noise generated by the operation of injector 11 for in-cylinder injection (hereinafter referred to as injector noise) tends to be more significant than in a port-injection type internal combustion engine.

As for the background learning, the object is absolutely to learn the background noise level in the normal or basic state, and therefore, when the injector noise is riding on the background noise in the basic state, learning of the basic state as such is desirable.

When the knocking suppression control described above is performed during background learning, the quantity of fuel injection by injector 11 for in-cylinder injection is changed from the basic value and, as a result, the start timing or end timing of fuel injection would be shifted from the gate period in which the background learning is performed, as will be described later, so that the background noise level in the gate period would be different from the basic value. Such phenomenon is not preferable in realizing accurate background learning.

Therefore, in the dual injection type internal combustion engine in accordance with the present embodiment, fixing means for fixing the start timing or end timing of fuel injection by injector 11 for in-cylinder injection during the background learning is provided. This will be described in the following.

Figure 6:
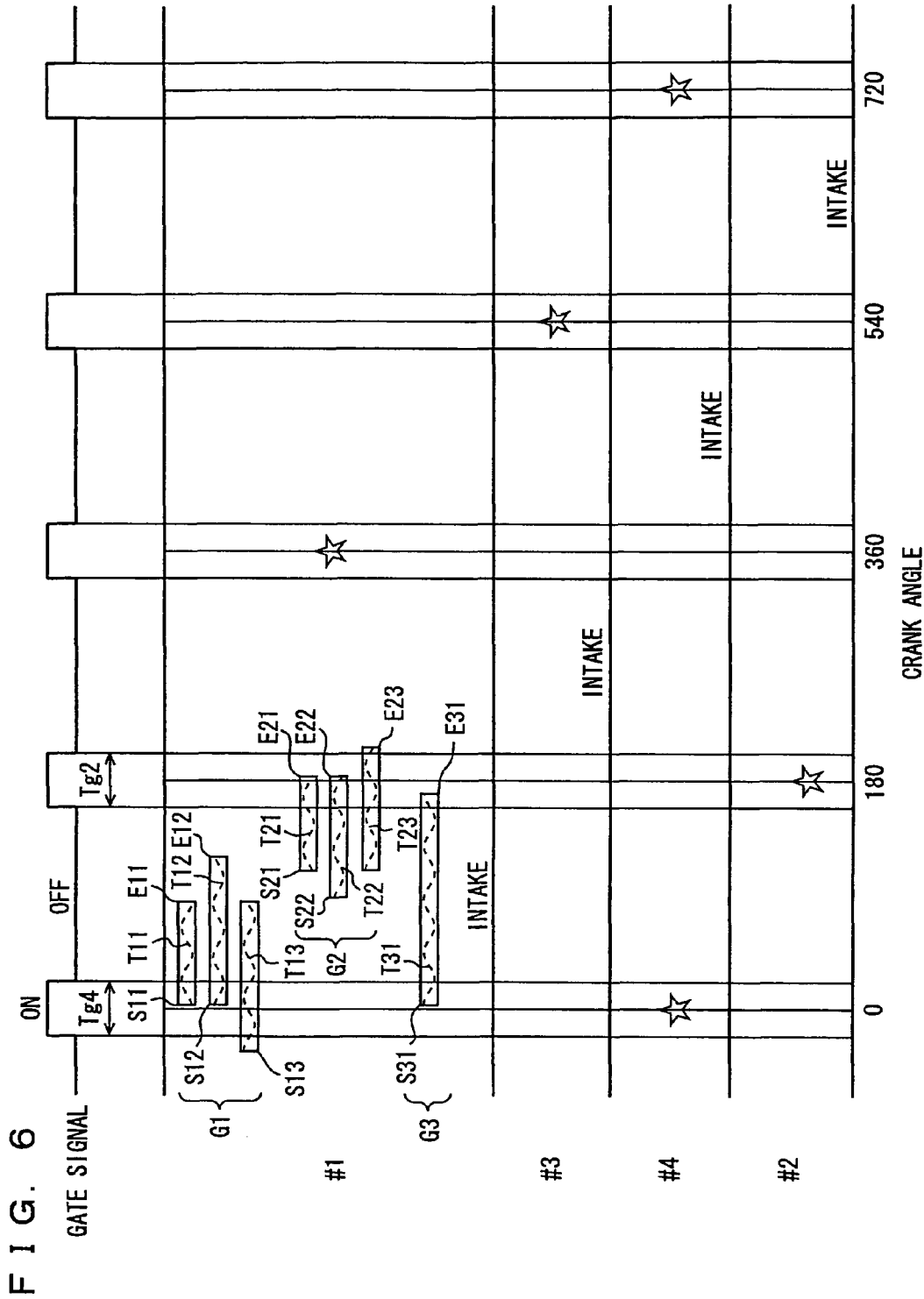
FIG. 6 represents an operation of the internal combustion engine, particularly representing a relation between the gate period and start and end timings of in-cylinder injection.

FIG. 6 shows an operation of the internal combustion engine in accordance with the present embodiment, in which the abscissa represents the crank angle, indicating a full cylinder cycle from 0° at the intake top dead center of the first cylinder #1 to 720°. From the upper portion of the figure, operations or strokes of the first cylinder #1, third cylinder #3, fourth cylinder #4 and the second cylinder #2 are shown in the order of ignition. Here, "intake" represents the intake stroke, and the star mark represents the spark timing.

At the uppermost portion of the figure, the on/off state of the gate signal generated by electronic control unit 30 is shown. The gate signal is originally for determining the period in which knock determination is made, and the knock determination is made by referring to the output signal of knock sensor 34 while the gate signal is on. This period is also referred to as the gate period meaning that the gate for obtaining the output value of knock sensor 34 is open. In the present embodiment, the output value of knock sensor 34 related to the background learning is obtained in the gate period.

In the present embodiment, setting of the on timing and off timing of the gate signal is done with reference to a map stored in advance in ROM 32 of electronic control unit 30. The map is defined as a three-dimensional map in relation to the engine speed and the engine load. It is noted, however, that the on timing and the off timing of the gate signal may be set as constant timings. In the shown example, the on timing and the off timing of the gate signal are set at timings before and after the spark timing of each cylinder, as knocking is likely near the spark timing of each cylinder.

Various patterns of in-cylinder injection executed by injector 11 for in-cylinder injection are shown in the column of first cylinder #1 of the figure. As fuel injection control is performed for each cylinder, similar patterns are observed on other cylinders. Here, only the patterns of first cylinder #1 are shown for simplicity. These patterns are all in the learning period immediately after the operating state of the engine made transition to the range B. Here, the background learning is performed for a period that corresponds to a prescribed number of ignitions. The number is, for example, at least 10, and in that case, the learning period corresponds to the crank angle range of 180°×10=1800°. Therefore, the learning period is longer than the period shown in FIG. 1.

In the figure, "T" represents injection period, "S" represents injection start timing, and "E" represents injection end timing, respectively. In the shown example, in-cylinder injection of the first cylinder #1 is done in the intake stroke, and the problem is whether the injection start timing S or injection end timing E is within the gate period Tg4 opened for ignition of the fourth cylinder #4 or within the gate period Tg2 opened for ignition of the second cylinder #2.

The first approach represented by G1 will be described first. The first approach focuses on the relation between the injection start timing S and the gate period Tg4. Here, T11 represents the injection period determined in accordance with the basic fuel injection control based on the operating state of the engine, and only the injection start timing S11 thereof is within the gate period Tg4. In accordance with the knocking suppression control of the first or third approach described above, the quantity of in-cylinder injection at one time may sometimes be increased and in that case, the injection period must also be made longer.

When the injection period is to be made longer, in the present embodiment, the injection start timing T12 is fixed to be the same as the basic injection start timing S11 and, instead, the injection end timing E12 that is originally not within the gate period Tg4 is retarded from the basic injection end timing E11, as can be seen from injection period T12. In this manner, the start timing for in-cylinder injection is fixed in the background learning.

On the contrary, the injection period is made longer not by advancing the injection start timing S13 to be earlier than the basic injection start timing S11, as shown by injection period T13. As shown in the figure, in that case, the injection start timing S13 would be out of the gate period Tg4, and it is possible that the background noise level differs from that in the basic state.

As described above, when the injection period is to be made longer as requested by the knocking suppression control and the basic injection start timing is within the gate period, such a state is maintained after the period is made longer. The injection start timing is fixed, to be the same even after the period is made longer. Thus, the background noise including the injector noise generated at the injection start timing, which is the same as in the basic state, can be obtained. Thus, accurate background learning becomes possible.

Next, the second approach represented by G2 will be described. The second approach focuses on the relation between the injection end timing E and the gate period Tg2. Here, T21 represents the injection period determined in accordance with the basic fuel injection control based on the operating state of the engine, and only the injection end timing E21 thereof is within the gate period Tg2. In accordance with the knocking suppression control of the first or third approach described above, the quantity of in-cylinder injection at one time may sometimes be increased and in that case, the injection period must also be made longer.

When the injection period is to be made longer, in the present embodiment, the injection end timing E22 is fixed to be the same as the basic injection end timing E21 and, instead, the injection start timing S22 that is originally not within the gate period Tg2 is advanced from the basic injection start timing S21, as can be seen from injection period T22. In this manner, the start timing for in-cylinder injection is fixed in the background learning.

On the contrary, the injection period is made longer not by retarding the injection end timing E23 to be later than the basic injection end timing E21, as shown by injection period T23. As shown in the figure, the injection end timing E23 would be out of the gate period Tg2, and it is possible that the background noise level differs from that in the basic state.

As described above, when the injection period is to be made longer as requested by the knocking suppression control and the basic injection end timing is within the gate period, such a state is maintained after the period is made longer. The injection end timing is fixed, to be the same even after the period is made longer. Thus, the background noise including the injector noise generated at the injection end timing that is the same as in the basic state, can be obtained. Thus, accurate background learning becomes possible.

Next, the third approach represented by G3 will be described. The third approach focuses on the relation between the injection start timing S and the gate period Tg4, and the relation between the injection end timing E and the gate period Tg2. Here, T31 represents the injection period determined in accordance with the basic fuel injection control based on the operating state of the engine. The injection start timing S31 is within the gate period Tg4, and the injection end timing E31 is within the gate period Tg2.

At this time, based on the same idea as the first and second approaches described above, the injection start timing S31 and the injection end timing S31 must be kept within the gate periods Tg4 and Tg2, respectively. Therefore, in the third approach, when the in-cylinder injection quantity is to be made larger as requested by the knocking suppression control, the injection start timing and the injection end timing are maintained at the basic timings, that is, the injection start timing and the injection end timing are maintained within the gate periods, and the fuel pressure of the fuel to be injected by injector 11 for in-cylinder injection is increased, so that the quantity of in-cylinder injection is increased without changing the injection period.

As described above, the fuel pressure of injector 11 for in-cylinder injection (that is, the pressure in fuel delivery pipe 13) is under feedback-control to match the target value on the map, based on the operating state of the engine. Therefore, by changing the basic target fuel pressure determined in this manner to a higher value, that is, a value that can attain comparable fuel injection quantity within the same injection period, knocking suppression control that increases the quantity of in-cylinder injection without changing the injection start timing S31 and injection end timing E31 can be realized.

In the first and second approaches G1 and G2, sometimes the injection end timing E or injection start timing S that is not fixed reaches a pre-set guard and it becomes impossible to further retard or advance the end timing or the start timing. In that case also, by increasing the fuel pressure, desired quantity of in-cylinder injection can be attained within a limited injection period.

(6) Background Learning

Next, the background learning process in accordance with the present embodiment will be described with reference to FIGS. 7 to 11. First, the main process of FIG. 7 will be described. This process is executed in synchronization with the spark timing of the engine (that is, at every crank period of 180°).

When this process starts, first, in S101, whether the operating state of the engine is in range B or not is determined. This determination is done by checking whether the engine speed obtained by crank sensor 46 and the engine load obtained by accelerator open position sensor 44 are in the range B of the range map of FIG. 2 or not.

When it is determined that the operating state is not in range B, that is, the operating state is in range A (S101: NO), the value of a learning counter CKCSG is set to 0 in S102, the injection start timing, injection end timing and target fuel pressure in fuel delivery pipe 13 are set to the basic values in accordance with the basic control in S103, S104 and S105, respectively, execution of knocking suppression control is terminated in S106 and the process ends.

When it is determined that the operating state is in range B (S101: YES), in S107, whether the last background learning area AREA is different from the present background learning are AREA or not is determined.

The background learning area AREA refers to a smaller area in range B, distinguished by whether the gate period described above includes only the injection start timing of in-cylinder injection, only the injection end timing, both timings or neither of the timings. By way of example, when only the injection start timing is included, the background learning area AREA is B1. The last background learning area AREA and the present background learning are AREA are compared so as to determine whether the area has been changed or not, and as the background noise level is set for every background learning area AREA (see FIG. 11). The background noise tends to vary dependent on how many factors of background noise generation (such as start and end of injection) are included in the gate period. By setting the background noise level for each of the areas, it becomes possible to set accurate levels for respective areas and to perform accurate knock determination for respective areas.

In S107, when it is determined that the last background learning area AREA is different from the present background learning area AREA (that is, the area has been changed) (S107: YES), the learning counter CKCSG is set to an initial value n in S108, and the flow proceeds to S109. On the other hand, if it is determined in S107 that the last background learning area AREA is not different from the present background learning area AREA (that is, the area has not been changed) (S107: NO), the flow directly proceeds to S109.

The initial value n of learning counter CKCSG defines the number of obtaining the output values of knock sensor 23 in the gate period and preferably, at least 10 is set as the value, as described above. As will be understood later, the data is obtained by the number of times equal to the initial value n for every background learning area AREA, and based on the data, the background noise level is set.

In S109, whether the value of learning counter CKCSG is 0 or not, that is, whether the background learning has been complete or not is determined. If completed (S109: YES), the flow proceeds to S103 and if not (S109: NO), the flow proceeds to S110.

In S110, whether the basic injection start timing of in-cylinder injection determined by the operating state of the engine (speed and load) is within the gate period or not is determined. If it is determined to be within the period (S110: YES), the flow proceeds to S111 and whether the basic injection end timing is within the gate period or not is determined. If it is determined to be out of the period (S111: NO), it means that only the basic injection start timing is within the gate period, and the flow proceeds to S112 in which the injection start timing of in-cylinder injection is fixed, and in S113, it is determined that background learning area is set to AREA=B1.

If it is determined in S110 that the basic injection start timing is not within the gate period (S110: NO) and it is determined in S116 that the basic injection end timing is within the gate period (S116: YES), it means that only the basic injection end timing of in-cylinder injection is within the gate period, and therefore, the injection end timing of in-cylinder injection is fixed in S117, and in S118, the background learning area is set to AREA=B2.

Further, if it is determined in S110 that the basic injection start timing is within the gate period (S110: YES) and it is determined in S111 that the basic injection end timing is within the gate period (S111: YES), it means that the basic injection start timing and basic injection end timing are both within the gate period, and therefore, the target fuel pressure is changed to a higher value in S114, and in S115, the background learning area is set to AREA=B3.

If it is determined in S110 that the basic injection start timing is not within the gate period (S110: NO) and it is determined in S116 that the basic injection end timing is not within the gate period (S116: NO), it means that neither the basic injection start timing nor the basic injection end timing is within the gate period, and therefore, in S119, the background learning area is set to AREA=B0.

When the background learning area AREA is set in S113, S118, S115 and S119 in this manner, the value of learning counter CKCSG is decremented by 1 in S120. Then, in S121, the knocking suppression control described above is performed, and in S122, the output value of knock sensor 23 in relation to the background learning is obtained.

The process above will be described, assuming an actual situation. For simplicity of description, here it is assumed that the background learning area AREA is not changed during the learning period.

When the engine is operating in range A, it is NO in S101, so that S102 to S106 are executed and the basic fuel injection control is performed. When the operating state of the engine makes a transition from this state to range B, it becomes YES in S101, and in S107, whether the background learning area AREA has been changed or not is determined. When S107 is executed for the first time, the answer is YES, so that the learning counter CKCSG is set to the initial value n (ex. 10) in S108, and thereafter, the flow proceeds through S109 to S110.

If it is assumed that the operating state of the engine after transition to range B is such that only the basic in-cylinder injection start timing is within the gate period, the flow successively proceeds to S110, S111, S112, S113, the injection start timing is fixed, the learning counter CKCSG is decremented by 1 in S120, fuel injection with knock suppressing control is performed in S121, and the knock sensor output value is obtained in S122.

When the process of the first time is finished, the first period (crank angle of 180°) is passed and the process of the second time starts, there is no area change, and therefore, S107: NO. Then, the value of learning counter CKCSG is kept at (n−1). Through the same route as the last time, the flow reaches S120, where the value of learning counter CKCSG is further decremented by 1 to (n−2). Thereafter, the process proceeds to S122, and the process of the second time ends.

After all, the process is repeated by the same number of times as the initial value n of the learning counter CKCSG, and when counter value=0, the answer becomes YES in S109, and the normal fuel injection control is resumed. Thus, for a certain background learning area AREA, the period in which the value of learning counter attains from the initial value n to 0 is the learning period.

When the background learning area AREA happens to be changed in the learning period for a specific background learning area AREA, the answer of S107 will be S107: YES, and learning counter CKCSG is returned to the initial value n, so that the process for the changed area is newly executed. It is noted, however, that the actual learning period is as short as about 1 second or shorter, and therefore, it is not likely that the background area AREA is changed during the learning period.

The processing of the knock sensor output value obtained in S122 will be described in the following.

Figure 7:
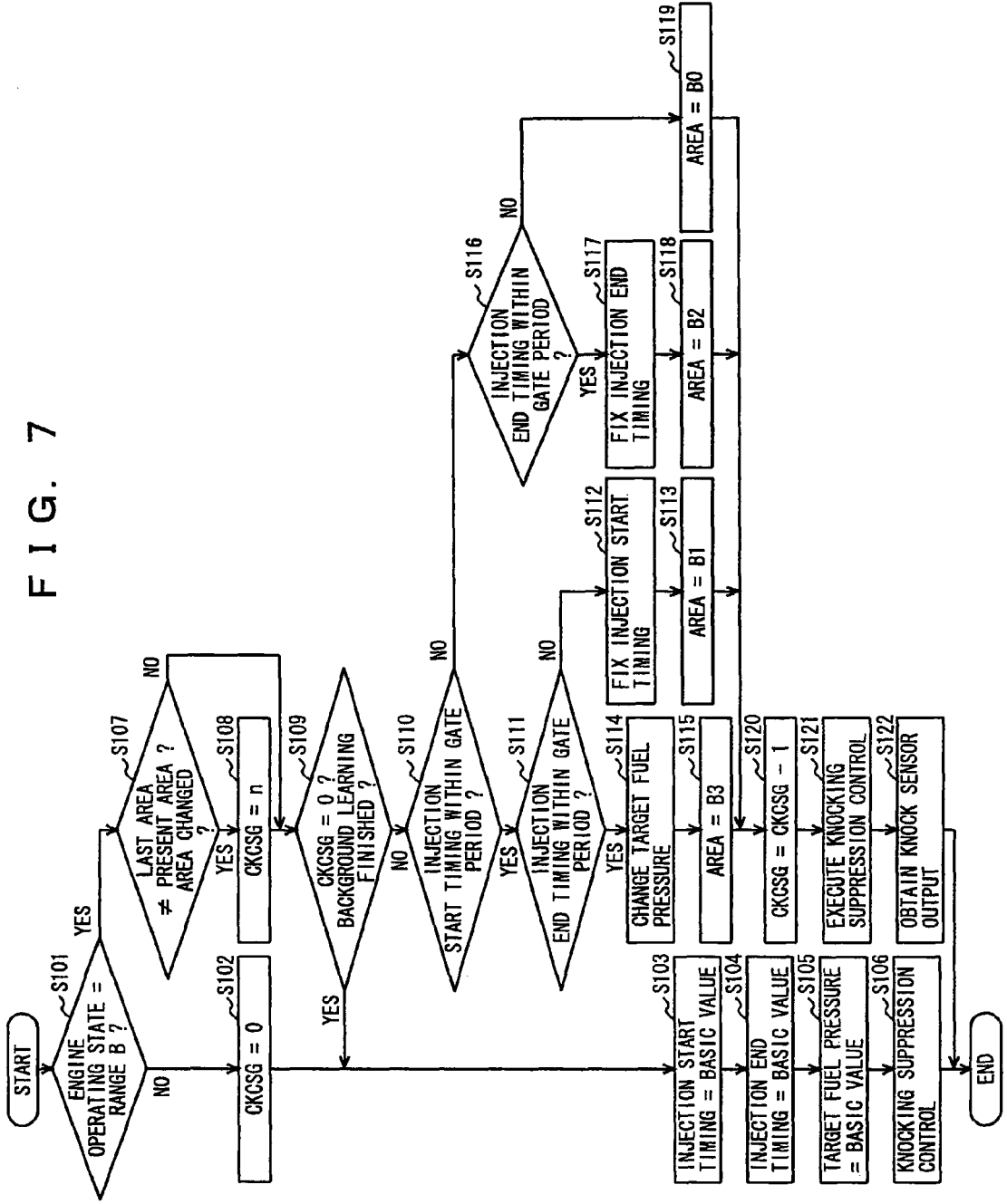
FIG. 7 is a flow chart representing a part of the background learning process, including means and step for fixing the start timing or end timing of in-cylinder injection, means and step for performing knocking suppression control during learning, and means and step for obtaining a knock sensor output value.
Figure 8:
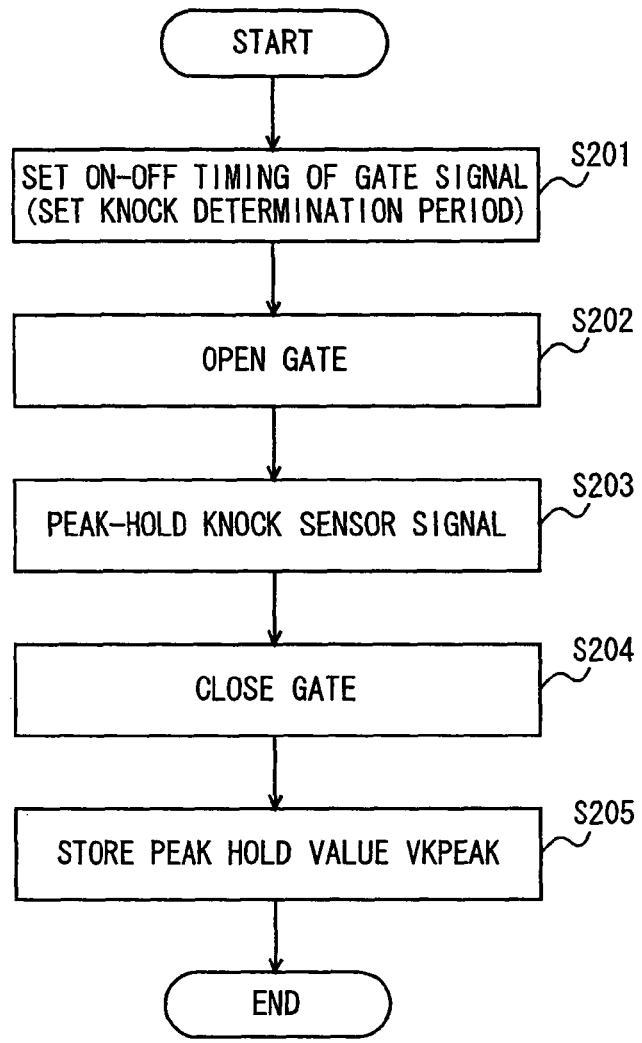
FIG. 8 is a flow chart representing a part of the background learning process, including means and step for executing a peak hold process for the knock sensor output obtained in the gate period.

FIG. 8 is a flow chart representing such a process. This process is also executed by electronic control unit 30 in synchronization with the process shown in FIG. 7 (namely, in the period corresponding to the crank angle of 180°).

First, in S201, the on timing and off timing of the gate signal are set. As described previously, the setting is done with reference to maps stored in advance, based on the engine speed and engine load.

The gate period is set in this manner, and when it comes to the on timing of the gate signal, the gate signal is turned on in S202, and the gate is opened. Next, the flow proceeds to S203, in which the peak-holding of the output signal of knock sensor 34 is executed. The peak-holding is performed until it comes to the off timing of the gate signal and the gate signal is turned off, that is, until the gate is closed, in S204.

Figure 9:
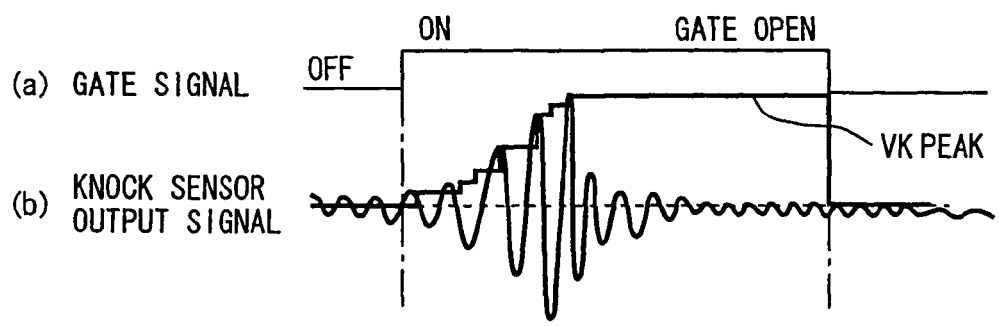
FIG. 9 illustrates a peak hold value of the knock sensor output signal.

As shown in FIG. 9, the peak-holding is done in such a manner that every time the output value of knock sensor 34 attains the maximum value after the gate signal is turned on, the value is updated. In this manner, when the gate signal is turned off, one peak hold value VKPEAK can be found for the just finished gate period. The thus found peak hold value VKPEAK is stored in RAM 33 of electronic control unit 30 in S205. Then the process ends.

Figure 10:
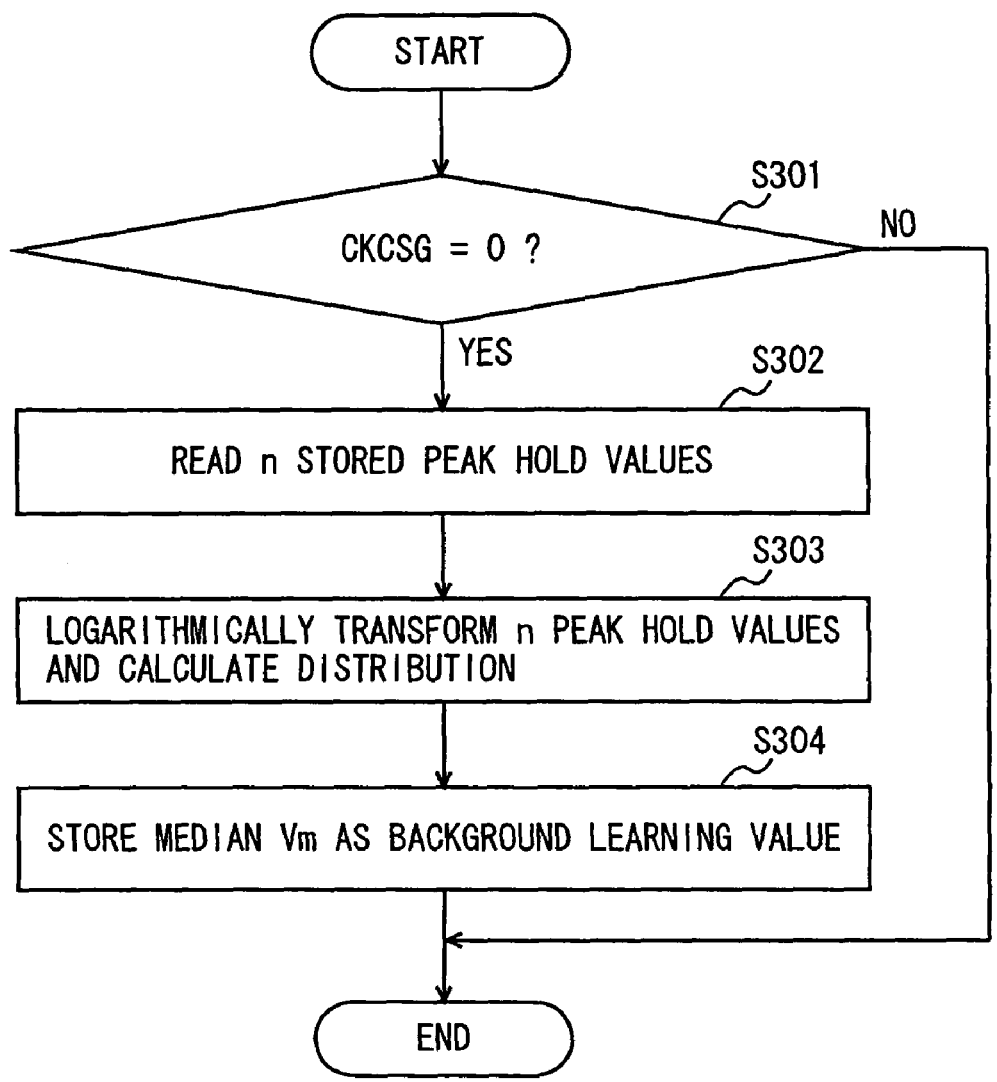
FIG. 10 is a flow chart representing a part of the background learning process, including means and step for processing a plurality of peak hold values to obtain the background level learning value.

The process of setting the background level learning value using the peak hold value VKPEAK will be described with reference to the flow chart of FIG. 10. This process is also executed by electronic control unit 30 in synchronization with the processes shown in FIGS. 7 and 8 (namely, in the period corresponding to the crank angle of 180°).

By the process of FIGS. 7 and 8, for a certain background learning area AREA, n peak hold values VKPEAK are stored. Therefore, in the process of FIG. 10, a method is adopted in which distribution of the n peak hold values VKPEAK is found, and the median thereof is taken as the background level learning value.

First, in S301, whether the value of learning counter CKCSG is 0 or not is determined. This is to determine whether the n peak hold values VKPEAK have been stored or not through the process of FIG. 8. If it is determined that the value of learning counter CKCSG is not 0, the present process is terminated. If it is determined that the value of learning counter CKCSG is 0, the n peak hold values VKPEAK stored in RAM 33 are read in S302.

In S303, the read n peak hold values VKPEAK are each subjected to logarithmic transformation to find n logarithmically transformed values LVpk, and the distribution DS such as shown in FIG. 11(a) of these logarithmically transformed values LVpk is found. In S304, the median Vm of the distribution DS is taken as the background learning value, and stored in RAM 33. Thus, the process ends and at the same time, background learning ends.

Figure 11:
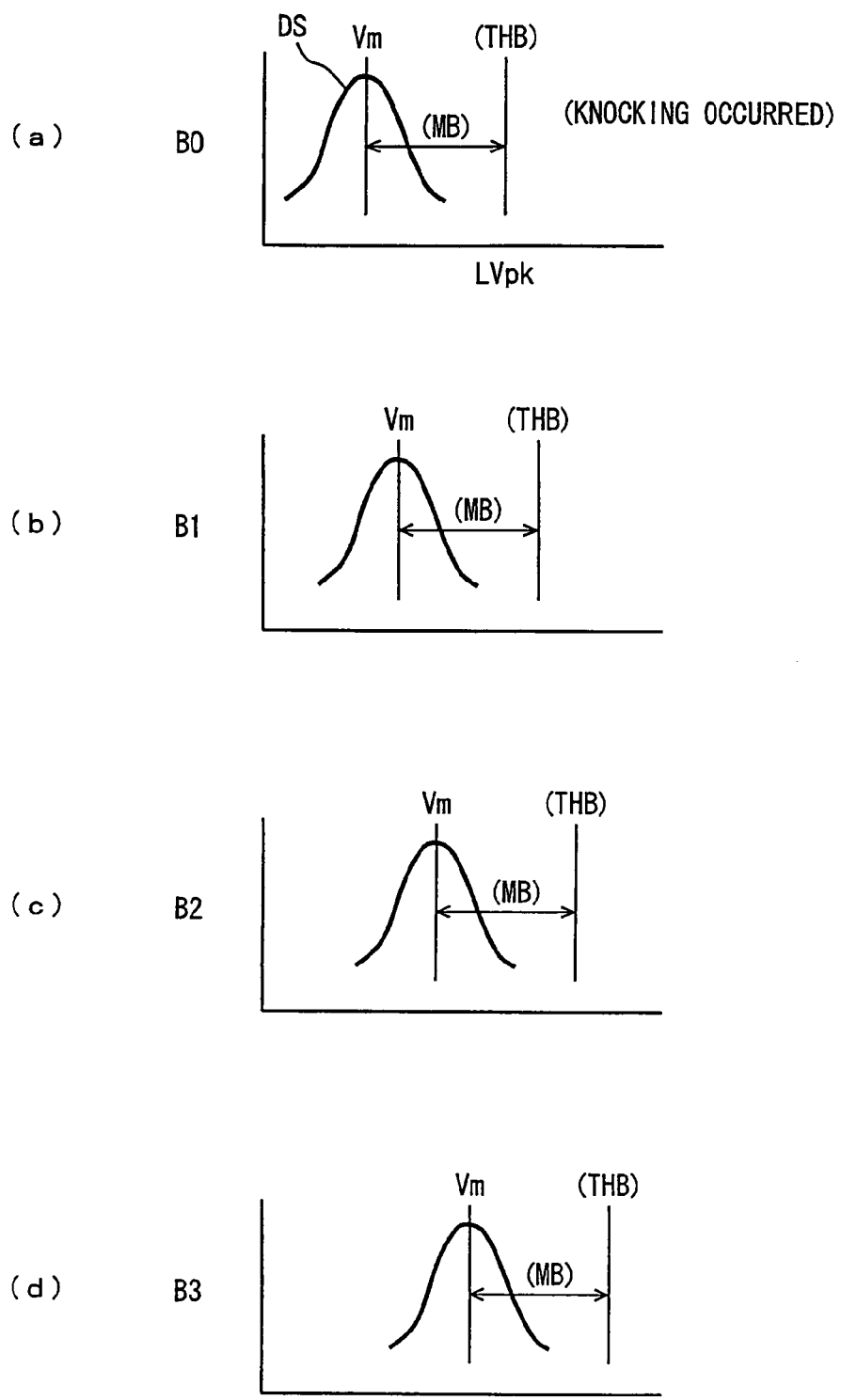
FIG. 11 represents background level learning values of respective background learning areas in range B.

When the background learning is executed in this manner, it follows that the background level learning value Vm is set for each of the back ground learning areas AREA=B0, B1, B2 and B3, as shown in FIG. 11, (a) to (d). Consequently, it becomes possible to set optimal background noise level individually, in accordance with the number of factors (start or end of in-cylinder injection) causing the background noise within the gate period.

The background level learning values Vm correspond to the background noise level BGNLB shown in FIG. 3, and by adding a prescribed value MB to the background level learning values Vm, knock determination threshold values THB can be set for respective areas (AREA=B0, B1, B2, B3) in range B, and thereafter knock determination can be made based on the knock determination threshold values THB. In (a) to (d) of FIG. 11, the abscissa is in logarithm, and therefore, in actual noise determination, the knock determination threshold value THB subjected to logarithmic transformation is used, and knock determination is made by the comparison between the knock determination threshold value THB and the logarithmically transformed knock sensor output value.

When the operating state of the engine makes a transition from range A to range B during normal operation, it is impossible to predict to which area (AREA=B0, B1, B2, B3) of range B the operation enters. In the present embodiment, when the actual operating state of the engine makes a transition to range B after learning, the area (AREA=B0, B1, B2, B3) in which the operating state of the engine is in after transition is specified by the same method as used at the time of learning, and the knock determination threshold value THB set based on the background level learning value Vm corresponding to that area is selected and used for knock determination. Therefore, no matter to which area the operation enters, accurate knock determination can be executed in each area.

In the embodiment above, of the entire operating range of the engine, the range in which the background noise is relatively high and therefore the knock determination threshold value should also be set to a relatively high value has been selected as range B in which background learning is done. It is possible, however, to select the range in which the basic start timing or end timing of in-cylinder injection is always within the gate period as the range B. The reason for this is that matching between the injection start timing or end timing and the gate period is one factor that causes higher background noise. In this case, the range B is divided into areas B1, B2 and B3, and accordingly, three values are set as the background learning values.

Various other embodiments of the present invention may be possible. For example, in the embodiment above, for each of the peak hold values VKPEAK of a plurality of (n) sensor output values, logarithmically transformed values LVpk are calculated, and the median Vm of the distribution of logarithmically transformed values LVpk is used as the background noise level learning value. It is possible, however, to more simply use an average of the plurality of sensor output values as the background noise level learning value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dual injection type internal combustion engine including an injector for in-cylinder injection and an injector for intake manifold injection, comprising:
   a knock sensor;
   a learning portion learning a background noise level based on an output signal of said knock sensor; and
   a knocking suppression control portion performing, while learning said background noise level, knocking suppression control by controlling fuel injection of at least one of said injector for in-cylinder injection and said injector for intake manifold injection, wherein said knocking suppression control portion increases ratio of fuel injection quantity by said injector for in-cylinder injection with respect to said injector for intake manifold injection to be larger than a basic ratio of fuel injection quantity determined by an operating state of the engine.

2. A dual injection type internal combustion engine including an injector for in-cylinder injection and an injector for intake manifold injection, comprising:

a knock sensor;

a learning portion learning a background noise level based on an output signal of said knock sensor; and a knocking suppression control portion performing, while learning said background noise level, knocking suppression control by controlling fuel injection of at least one of said injector for in-cylinder injection and said injector for intake manifold injection, wherein said knocking suppression control portion executes synchronous injection in which at least part of an injection period of fuel injection by said injector for intake manifold injection is overlapped with a valve-open period of an intake valve.

3. A dual injection type internal combustion engine including an injector for in-cylinder injection and an injector for intake manifold injection, comprising:

a knock sensor;

a learning portion learning a background noise level based on an output signal of said knock sensor; and a knocking suppression control portion performing, while learning said background noise level, knocking suppression control by controlling fuel injection of at least one of said injector for in-cylinder injection and said injector for intake manifold injection, wherein said knocking suppression control portion increases ratio of fuel injection quantity by said injector for in-cylinder injection in a compression stroke with respect to an intake stroke to be larger than a basic ratio of fuel injection quantity determined by an operating state of the engine.

4. The dual injection type internal combustion engine according to claim 1, further comprising a knocking control portion adjusting a spark timing of said internal combustion engine in accordance with a result of a knock determination performed based on a comparison between said output signal of said knock sensor and a knock determination threshold which is set according to a result of the learning of said background noise level, after learning said background noise level.

5. A dual injection type internal combustion engine including an injector for in-cylinder injection and an injector for intake manifold injection, comprising:

a knock sensor;

learning means for learning a background noise level based on an output signal of said knock sensor; and knocking suppression control means for performing, while learning said background noise level, knocking suppression control by controlling fuel injection of at least one of said injector for in-cylinder injection and said injector for intake manifold injection, wherein said knocking suppression control means increases ratio of fuel injection quantity by said injector for in-cylinder injection with respect to said injector for intake manifold injection to be larger than a basic ratio of fuel injection quantity determined by an operating state of the engine.

6. A dual injection type internal combustion engine including an injector for in-cylinder injection and an injector for intake manifold injection, comprising:

a knock sensor;

learning means for learning a background noise level based on an output signal of said knock sensor; and knocking suppression control means for performing, while learning said background noise level, knocking suppression control by controlling fuel injection of at least one of said injector for in-cylinder injection and said injector for intake manifold injection, wherein said knocking suppression control means executes synchronous injection in which at least part of an injection period of fuel injection by said injector for intake manifold injection is overlapped with a valve-open period of an intake valve.

7. A dual injection type internal combustion engine including an injector for in-cylinder injection and an injector for intake manifold injection, comprising:

a knock sensor;

learning means for learning a background noise level based on an output signal of said knock sensor; and knocking suppression control means for performing, while learning said background noise level, knocking suppression control by controlling fuel injection of at least one of said injector for in-cylinder injection and said injector for intake manifold injection, wherein said knocking suppression control means increases ratio of fuel injection quantity by said injector for in-cylinder injection in a compression stroke with respect to an intake stroke to be larger than a basic ratio of fuel injection quantity determined by an operating state of the engine.

8. The dual injection type internal combustion engine according to claim 5, further comprising knocking control means for adjusting a spark timing of said internal combustion engine in accordance with a result of a knock determination performed based on a comparison between said output signal of said knock sensor and a knock determination threshold which is set according to a result of the learning of said background noise level, after learning said background noise level.

* * * * *